US012631932B2

(12) United States Patent
Cheng et al.

(10) Patent No.: US 12,631,932 B2
(45) Date of Patent: May 19, 2026

(54) DISPLAY DEVICE AND MANUFACTURING METHOD THEREOF

(71) Applicant: E Ink Holdings Inc., Hsinchu (TW)

(72) Inventors: I-Feng Cheng, Hsinchu (TW); Yen-Ze Huang, Hsinchu (TW); Jen-Shiun Huang, Hsinchu (TW); Ling-Chiang Chu, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 278 days.

(21) Appl. No.: 18/499,210

(22) Filed: Nov. 1, 2023

(65) Prior Publication Data

US 2024/0192565 A1     Jun. 13, 2024

(30) Foreign Application Priority Data

Dec. 9, 2022     (TW) ................................... 111147310

(51) Int. Cl.
    *G02F 1/167*        (2019.01)
    *G02B 26/00*        (2006.01)
    *G02F 1/1675*       (2019.01)

(52) U.S. Cl.
    CPC ......... *G02F 1/1675* (2019.01); *G02B 26/005* (2013.01); *G02F 1/167* (2013.01); *G02F 2201/50* (2013.01)

(58) Field of Classification Search
    CPC .... G02F 1/1675; G02F 1/167; G02F 2201/50; G02B 26/005
    See application file for complete search history.

(56) References Cited

U.S. PATENT DOCUMENTS

| | | | |
|---|---|---|---|
| 7,504,332 B2 * | 3/2009 | Won ........................ | C23C 28/42 438/622 |
| 8,405,233 B2 | 3/2013 | Blizzard et al. | |
| 8,901,015 B2 * | 12/2014 | Chen ....................... | C23C 16/26 438/778 |
| 9,087,488 B1 | 7/2015 | Zehner | |
| 9,862,176 B1 * | 1/2018 | Zehner ................... | B32B 37/18 |
| 2011/0272682 A1 * | 11/2011 | Blizzard .............. | H10K 59/873 427/256 |
| 2013/0120227 A1 * | 5/2013 | Tanikawa ................ | G02F 1/167 345/55 |
| 2018/0097199 A1 * | 4/2018 | Jo ......................... | H10K 59/131 |
| 2020/0192176 A1 * | 6/2020 | Bull ......................... | C09D 5/24 |
| 2022/0199956 A1 * | 6/2022 | Mandlik ............. | H01L 25/0753 |

FOREIGN PATENT DOCUMENTS

| | | |
|---|---|---|
| CN | 113534560 | 10/2021 |
| CN | 114488645 | 5/2022 |
| TW | 201322214 | 6/2013 |

* cited by examiner

*Primary Examiner* — Mustak Choudhury
(74) *Attorney, Agent, or Firm* — JCIPRNET

(57)     ABSTRACT

A display device includes a driving substrate, a display medium layer, a water vapor barrier layer, a protective layer, and a glue layer. The display medium layer is disposed on the driving substrate. The water vapor barrier layer is disposed on the display medium layer and covers a periphery of the display medium layer. The protective layer is disposed on the water vapor barrier layer. The glue layer covers a periphery of the water vapor barrier layer and at least part of a periphery of the protective layer. A water vapor transmission rate of the water vapor barrier layer is less than a water vapor transmission rate of the glue layer.

10 Claims, 7 Drawing Sheets

100a

DISPLAY DEVICE AND MANUFACTURING METHOD THEREOF

CROSS-REFERENCE TO RELATED APPLICATION

This application claims the priority benefit of Taiwan application serial no. 111147310, filed on Dec. 9, 2022. The entirety of the above-mentioned patent application is hereby incorporated by reference herein and made a part of this specification.

BACKGROUND

Technical Field

The disclosure relates to a display device and a manufacturing method thereof, and in particular to a display device capable of increasing lateral water barrier effect and a manufacturing method thereof.

Description of Related Art

In the existing electronic paper display, a display medium layer is located between a protective layer and a driving substrate. After the above-mentioned components are assembled, a glue layer is formed between the protective layer and the display medium layer through edged sealing and extends to cover the surrounding surface of the protective layer, so as to serve as a lateral water vapor barrier structure of the electronic paper display. However, the edged sealing forms a wider water vapor penetration path (that is, the distance between the protective layer and the driving substrate), and the water vapor transmission rate (WVTR) of the current glue layer cannot pass environmental testing. If the WVTR of the glue layer is to be improved, viscosity is inevitably increased and the operability of the process is sacrificed. Although another pinched sealing may effectively reduce the width of the water vapor penetration path, an air gap is inevitably generated and the narrow frame design is sacrificed.

SUMMARY

The disclosure provides a display device and a manufacturing method thereof, which may increase lateral water barrier effect and may have better structural reliability.

The display device of the disclosure includes a driving substrate, a display medium layer, a water vapor barrier layer, a protective layer, and a glue layer. The display medium layer is disposed on the driving substrate. The water vapor barrier layer is disposed on the display medium layer and covers a periphery of the display medium layer. The protective layer is disposed on the water vapor barrier layer. The glue layer covers a periphery of the water vapor barrier layer and at least part of a periphery of the protective layer. A water vapor transmission rate (WVTR) of the water vapor barrier layer is less than a WVTR of the glue layer.

In an embodiment of the disclosure, light transmittance of the above-mentioned water vapor barrier layer is greater than 85%.

In an embodiment of the disclosure, the above-mentioned driving substrate has a surface, and the display medium layer is located on the surface to expose a part of the surface. The water vapor barrier layer further extends to cover the surface exposed by the display medium layer.

In an embodiment of the disclosure, an air gap exists between the water vapor barrier layer and the periphery of the display medium layer.

In an embodiment of the disclosure, a material of the above-mentioned water vapor barrier layer includes a polymer-derived ceramic material or an organic polymer.

In an embodiment of the disclosure, the protective layer includes a cover plate and a barrier layer. The barrier layer covers a side surface of the cover plate, and a part of the barrier layer is located between the cover plate and the water vapor barrier layer.

In an embodiment of the disclosure, the above-mentioned display device further includes an optical glue layer, disposed between the water vapor barrier layer and the protective layer or between the water vapor barrier layer and the display medium layer, and configured to fix the protective layer to the display medium layer.

The manufacturing method of the display device of the disclosure includes the following steps. A driving substrate is provided. A display medium layer is disposed on the driving substrate. A water vapor barrier layer is formed on the display medium layer and covers a periphery of the display medium layer. A protective layer is disposed on the water vapor barrier layer. A glue layer is formed on a periphery of the water vapor barrier layer and at least part of a periphery of the protective layer. A water vapor transmission rate (WVTR) of the water vapor barrier layer is less than a WVTR of the glue layer.

In an embodiment of the disclosure, the above-mentioned method for forming the water vapor barrier layer includes spray coating or slit coating.

In an embodiment of the disclosure, the above-mentioned method for forming the glue layer includes dispensing.

Based on the above, in the design of the display device of the disclosure, the water vapor barrier layer covers the periphery of the display medium layer, and the glue layer covers the periphery of the water vapor barrier layer. The WVTR of the water vapor barrier layer is less than the WVTR of the glue layer. In this way, in addition to improving the water vapor barrier effect of the display medium layer in the lateral direction to prevent damage to the display medium layer caused by lateral water vapor, the width of the water barrier channel may also be effectively reduced. Therefore, the display device of the disclosure may have better structural reliability, and may achieve the effect of the narrow frame.

In order to make the aforementioned features and advantages of the disclosure comprehensible, embodiments accompanied with drawings are described in detail as follows.

DESCRIPTION OF THE EMBODIMENTS

Embodiments of the disclosure may be understood together with drawings, and the drawings of the disclosure are also regarded as a part of description of the disclosure. It should be understood that the drawings of the disclosure are not drawn to scale and, in fact, the dimensions of elements may be arbitrarily enlarged or reduced in order to clearly represent the features of the disclosure.

Figure 1:
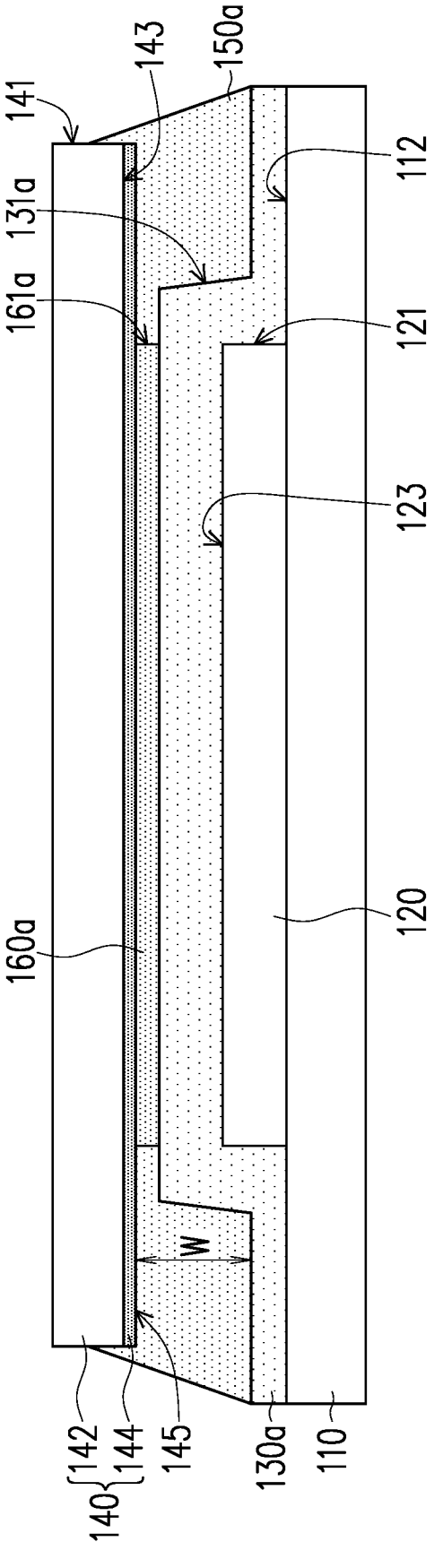
FIG. 1 is a schematic cross-sectional view of a display device according to an embodiment of the disclosure.

FIG. 1 is a schematic cross-sectional view of a display device according to an embodiment of the disclosure. Referring to FIG. 1, in the embodiment, a display device 100a includes a driving substrate 110, a display medium layer 120, a water vapor barrier layer 130a, a protective layer 140, and a glue layer 150a. The display medium layer 120 is disposed on the driving substrate 110. The water vapor barrier layer 130a is disposed on the display medium layer 120 and covers a periphery 121 of the display medium layer 120, that is, the water vapor barrier layer 130a covers each side face of the display medium layer 120. The protective layer 140 is disposed on the water vapor barrier layer 130a. The glue layer 150a covers a periphery 131a of the water vapor barrier layer 130a and at least part of a periphery 141 of the protective layer 140. A water vapor transmission rate (WVTR) of the water vapor barrier layer 130a is less than a WVTR of the glue layer 150a, that is, the water vapor barrier effect of the water vapor barrier layer 130a is better than the water vapor barrier effect of the glue layer 150a. The periphery referred to in the specification is defined as surrounding each side by the top view, and is defined as each side face by the cross-sectional view, for example, the glue layer 150a covering the periphery 131a of the water vapor barrier layer 130a is defined as the glue layer 150a covering each side face of the water vapor barrier layer 130a.

In detail, in the embodiment, the driving substrate 110 has a surface 112. The driving substrate 110 is, for example, an active device matrix substrate, such as a thin film transistor (TFT) array substrate or a thin film diode (TFD) array substrate, but is not limited thereto. The display medium layer 120 is located on the surface 112 to expose a part of the surface 112. The display medium layer 120 is, for example, an electrophoretic display thin film or an electrowetting display thin film, but is not limited thereto. In addition to covering an upper surface 123 and the periphery 121 of the display medium layer 120, the water vapor barrier layer 130a further extends to cover the surface 112 of the driving substrate 110 exposed by the display medium layer 120, and wraps the display medium layer 120 therein. Here, the WVTR of the water vapor barrier layer 130a is, for example, 1 g/m$^2$ day. The water vapor barrier layer 130a adopts an optical grade material, such as a polymer-derived ceramic material or an organic polymer. In an embodiment, light transmittance of the water vapor barrier layer 130a may be greater than 85%. The WVTR of the glue layer 150a is, for example, 10 g/m$^2$ day. The glue layer 150a is, for example, epoxy, polymethylmethacrylate (PMMA) or silicone, but is not limited thereto.

Referring to FIG. 1 again, the protective layer 140 of the embodiment includes a cover plate 142 and a barrier layer 144. The barrier layer 144 covers a side surface 143 of the cover plate 142, and a part of the barrier layer 144 is located between the cover plate 142 and the water vapor barrier layer 130a. A WVTR of the barrier layer 144 is, for example, 10$^{-3}$ g/m$^2$ day, which may be configure to block water vapor. A distance from a bottom surface 145 of the barrier layer 144 to the surface 112 of the driving substrate 110 is the width of a water barrier channel. However, since the water vapor barrier layer 130a of the embodiment extends to cover the surface 112 of the driving substrate 110, a width W of the water barrier channel may be narrowed, that is, the length required to block water vapor may be shortened, thereby achieving the narrow frame design. The protective layer 140 in the embodiment may be a single-layer structure, such as an anti-glare layer or a cover plate.

In addition, in the embodiment, the display device 100a further includes an optical glue layer 160a. The optical glue layer 160a is disposed between the water vapor barrier layer 130a and the protective layer 140 and configured to fix the protective layer 140 to the display medium layer 120. The optical glue layer 160a is, for example, a thin film-like optical clear adhesive (OCA). It should be noted that the orthographic projection of the optical glue layer 160a on the display medium layer 120 may be slightly larger than or equal to the display medium layer 120, but in another not-shown embodiment, the optical glue layer 160a may also have the same width as the protective layer 140 and be configured in a conformal shape, which still belongs to the protection scope of the disclosure.

As shown in FIG. 1, the glue layer 150a covers the periphery 131a of the water vapor barrier layer 130a, a periphery 161a of the optical glue layer 160a, and a part of the periphery 141 of the protective layer 140. In the embodiment, due to the disposition of the water vapor barrier layer 130a, the number of water vapor penetration interfaces is increased. According to the diffusion theory, it may be known that the time of the unsteady state of water vapor may be increased, which may delay the time water vapor reaches the water vapor state threshold value. That is, the diffusion rate of water vapor intrusion may be slowed down.

In short, since the water vapor barrier layer 130a covers the periphery 121 of the display medium layer 120 and the surface 112 of the driving substrate 110, and the glue layer 150a covers the periphery 131a of the water vapor barrier layer 130a, the WVTR of the water vapor barrier layer 130a is less than the WVTR of the glue layer 150a. In this way, in addition to increasing the water vapor penetration interface to slow down the rate of water vapor intrusion, so as to improve the water vapor barrier effect of the display medium layer 120 in the lateral direction, thereby preventing the display medium layer 120 from being damaged by lateral water vapor, such a way may also effectively reduce the width W of the water barrier channel, and shorten the distance required for blocking water vapor. Therefore, the display device 100a of the embodiment may have better structural reliability, and may achieve the effect of the narrow frame.

It has to be noted here that the following embodiments use the element numerals and part of the contents of the foregoing embodiments, the same numerals are used to denote the same or similar elements, and the description of the same technical content is omitted. For the description of the omitted parts, reference may be made to the foregoing embodiments, and thus the description is not repeated in the following embodiments.

Figure 2:
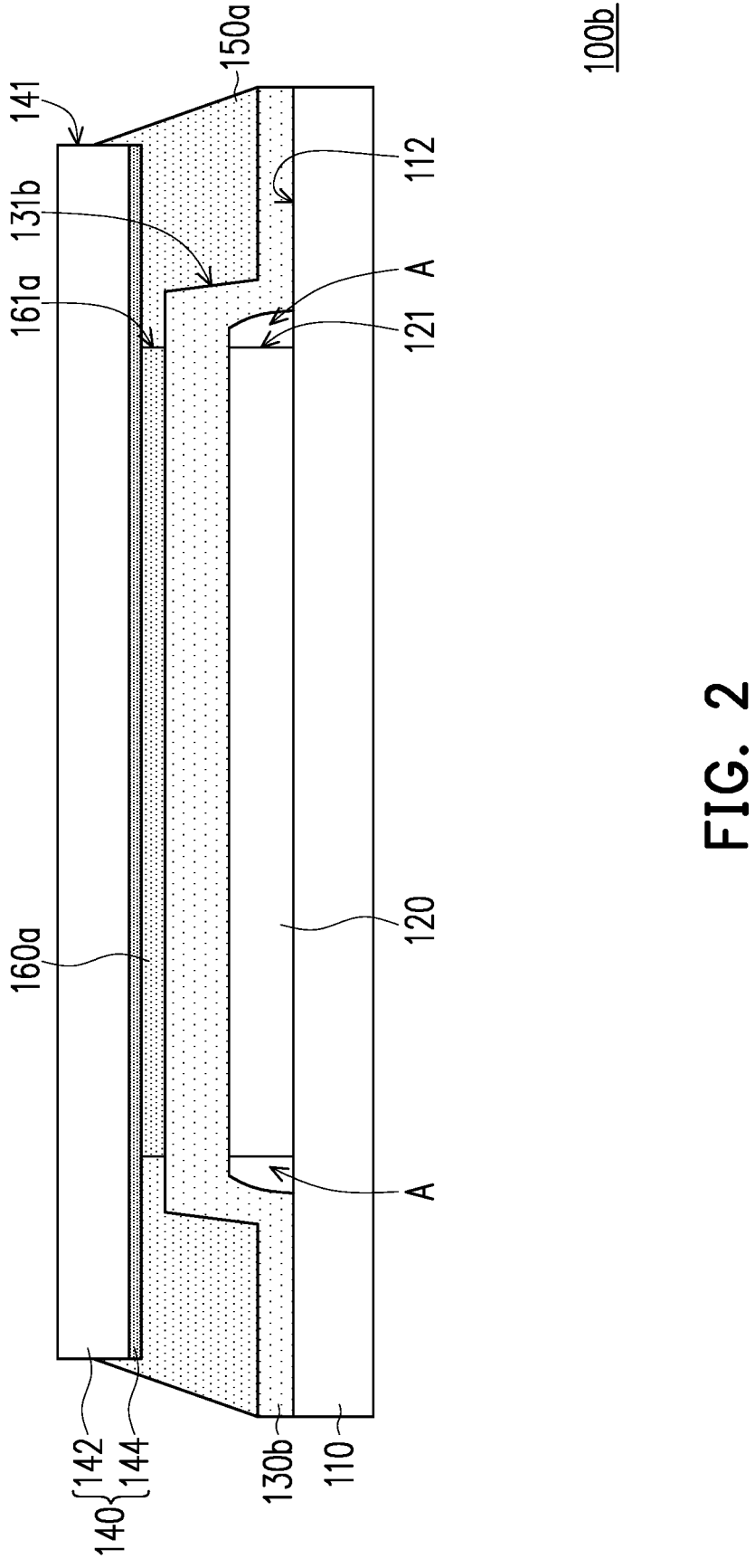
FIG. 2 is a schematic cross-sectional view of a display device according to another embodiment of the disclosure.

FIG. 2 is a schematic cross-sectional view of a display device according to another embodiment of the disclosure. Please refer to FIGS. 1 and 2 at the same time. A display device 100b of the embodiment is similar to the display device 100a of FIG. 1. The difference between the two is that in the embodiment, an air gap A exists between a water vapor barrier layer 130b and the periphery 121 of the display medium layer 120. That is to say, the water vapor barrier layer 130b is not in contact with the periphery 121 of the display medium layer 120. Instead, the air gap A is formed. Here, the glue layer 150a still covers the periphery 131b of the water vapor barrier layer 130b, the periphery 161a of the optical glue layer 160a, and the part of the periphery 141 of the protective layer 140. The water vapor barrier layer 130b and the glue layer 150a are disposed to increase the water vapor penetration interface to slow down the rate of water vapor intrusion.

Figure 3:
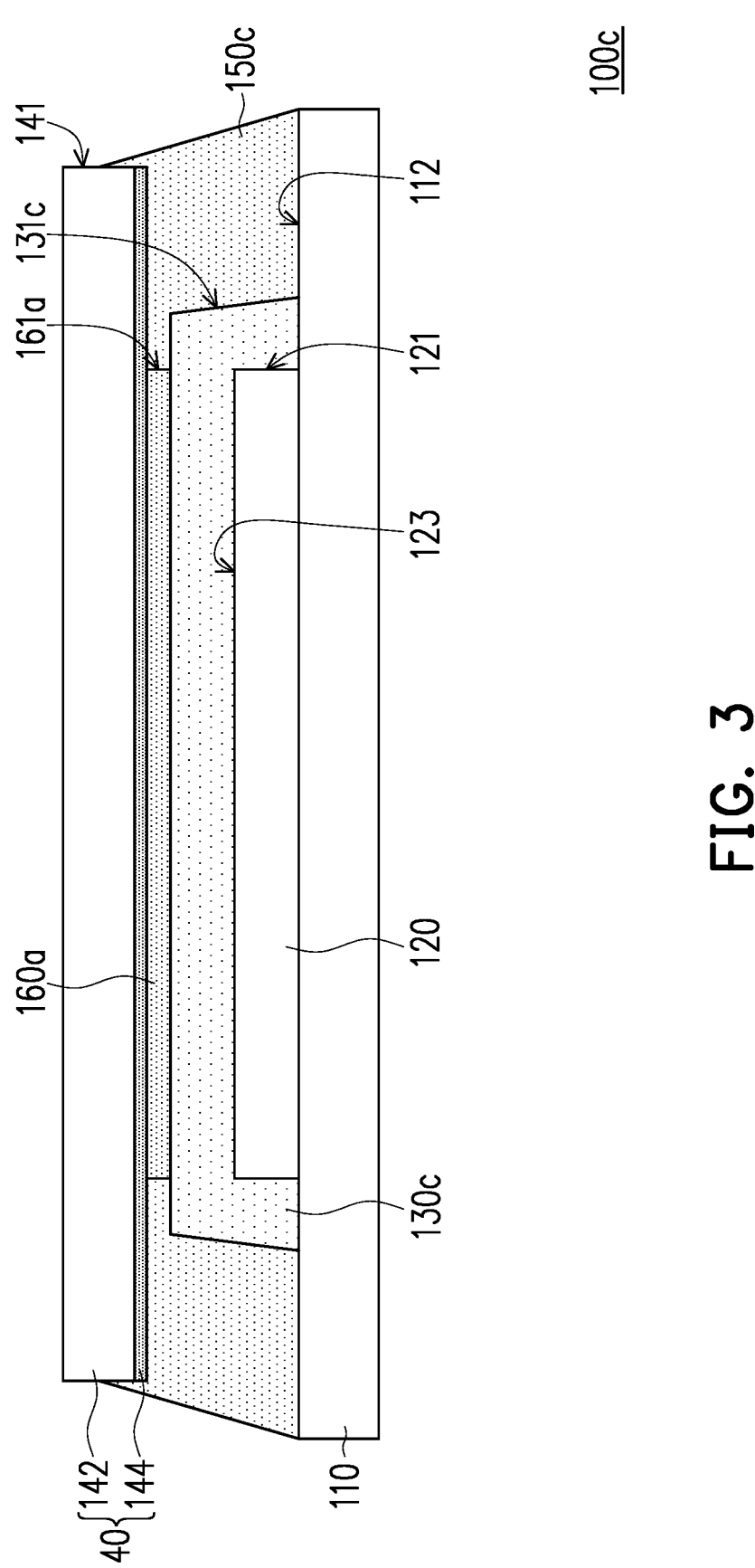
FIG. 3 is a schematic cross-sectional view of a display device according to another embodiment of the disclosure.

FIG. 3 is a schematic cross-sectional view of a display device according to another embodiment of the disclosure. Please refer to FIGS. 1 and 3 at the same time. A display device 100c of the embodiment is similar to the display device 100a of FIG. 1. The difference between the two is that in the embodiment, a water vapor barrier layer 130c covers the upper surface 123 and the periphery 121 of the display medium layer 120 and the part of the surface 112 of the driving substrate 110. That is to say, the water vapor barrier layer 130c does not completely cover the surface 112 of the driving substrate 110 exposed by the display medium layer 120. Here, a glue layer 150c covers the surface 112 of the driving substrate 110, a periphery 131c of the water vapor barrier layer 130c, the periphery 161a of the optical glue layer 160a, and the part of the periphery 141 of the protective layer 140. The water vapor barrier layer 130c and the glue layer 150c are disposed to increase the water vapor penetration interface to slow down the rate of water vapor intrusion.

The above merely describes the structures of the display devices 100a, 100b, and 100c of the embodiments. A manufacturing method of the display device 100a of the embodiment is to be described below with reference to FIGS. 4A to 4F.

FIGS. 4A to 4F are schematic cross-sectional views of a manufacturing method of a display device according to an embodiment of the disclosure. In the manufacture of the display device 100a of the embodiment, first, referring to FIG. 4A, the driving substrate 110 is provided. The driving substrate 110 is, for example, an active device matrix substrate, and may be, for example, a thin film transistor (TFT) array substrate or a thin film diode (TFD) array substrate, but not limited thereto.

Figures 4A, 4B:
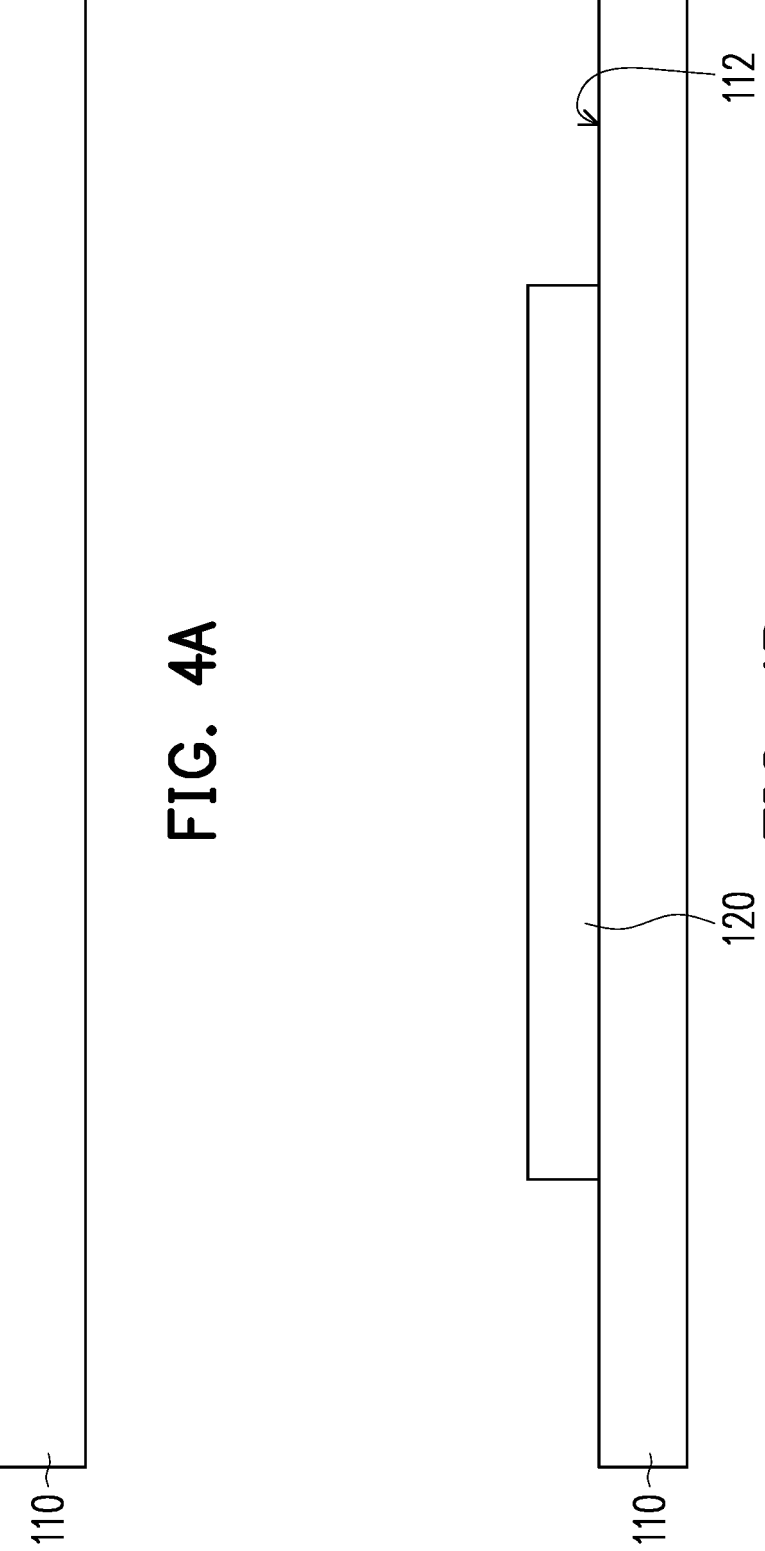
FIGS. 4A to 4F are schematic cross-sectional views of a manufacturing method of a display device according to an embodiment of the disclosure.

Next, referring to FIG. 4B, the display medium layer 120 is disposed on the driving substrate 110, and the display medium layer 120 is located on the surface 112 of the driving substrate 110 and a part of the surface 112 is exposed. The display medium layer 120 is, for example, an electrophoretic display thin film or an electrowetting display thin film, but is not limited thereto.

Figures 4C, 4D:
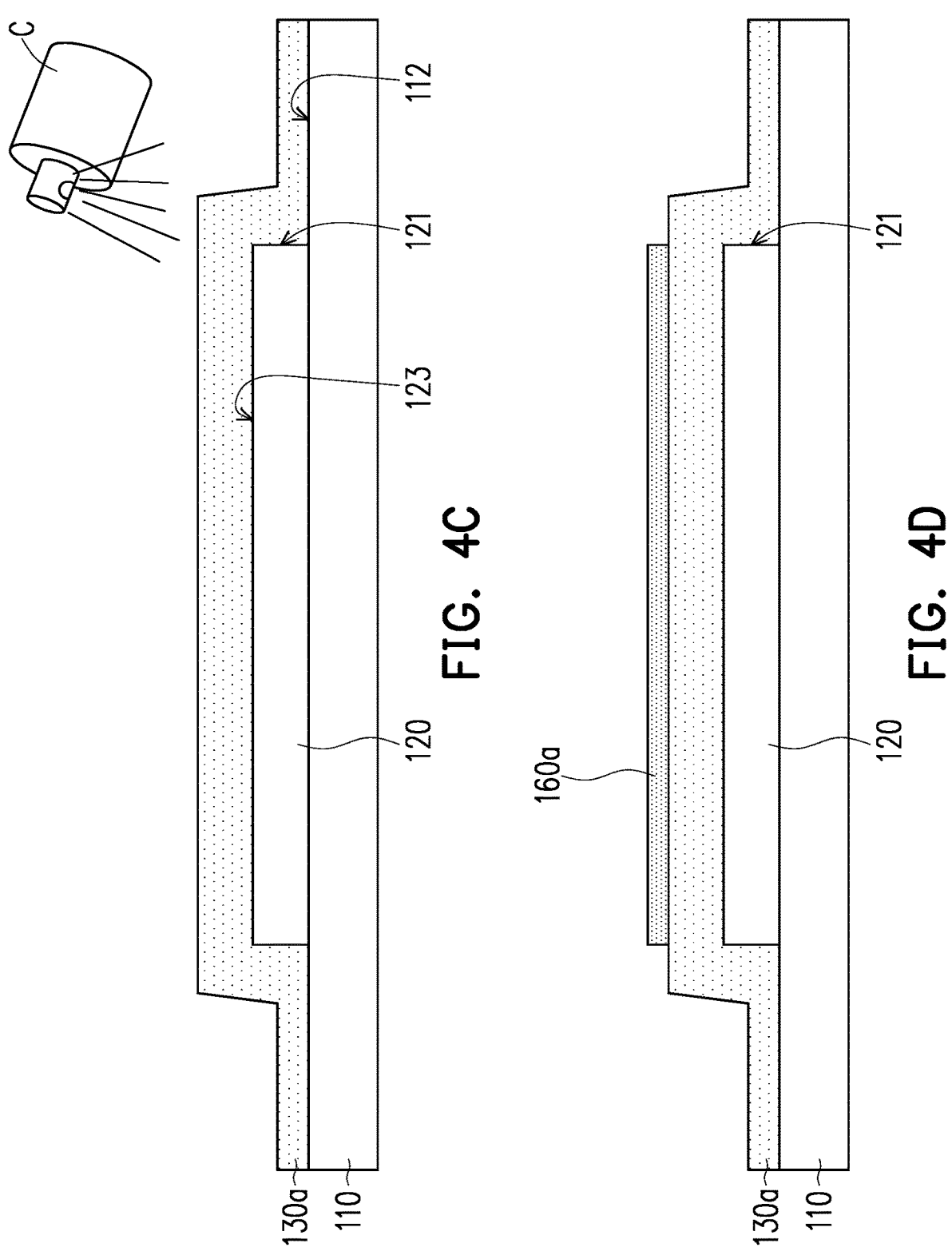

Next, referring to FIG. 4C, the water vapor barrier layer 130a is formed on the upper surface 123 of the display medium layer 120 and covers the periphery 121 of the display medium layer 120 and the surface 112 of the driving substrate 110 exposed by the display medium layer 120. That is, the water vapor barrier layer 130a encapsulates the display medium layer 120. Here, the method for forming the water vapor barrier layer 130a is, for example, spray coating or slit coating through a spray coating tool C. The WVTR of the water vapor barrier layer 130a is, for example, 1 g/m² day, and the water vapor barrier layer 130a adopts an optical grade material, such as a polymer-derived ceramic material or an organic polymer. In an embodiment, the light transmittance of the water vapor barrier layer 130a may be greater than 85%.

Next, referring to FIG. 4D, the optical glue layer 160a is disposed on the water vapor barrier layer 130a, the optical glue layer 160a is pasted on the water vapor barrier layer 130a, and the orthographic projection of the optical glue layer 160a on the display medium layer 120 may be slightly larger than or equal to the display medium layer 120. The optical glue layer 160a is, for example, a thin film-like optical clear adhesive (OCA).

Figure 4E:
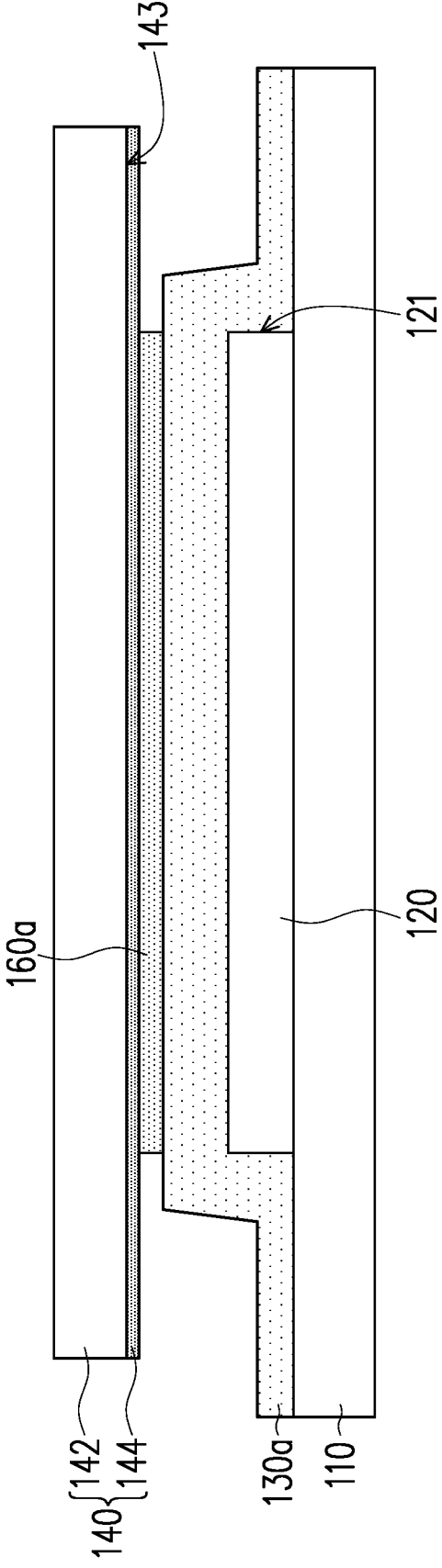

Afterwards, referring to FIG. 4E, the protective layer 140 is disposed on the water vapor barrier layer 130a, and the protective layer 140 is fixed on the display medium layer 120 through the optical glue layer 160a. Here, the protective layer 140 includes the cover plate 142 and the barrier layer 144. The barrier layer 144 covers the side surface 143 of the cover plate 142, and a part of the barrier layer 144 is located between the cover plate 142 and the water vapor barrier layer 130a. The WVTR of the barrier layer 144 is, for example, $10^{-3}$ g/m² day, which may be configured to block water vapor.

Figure 4F:
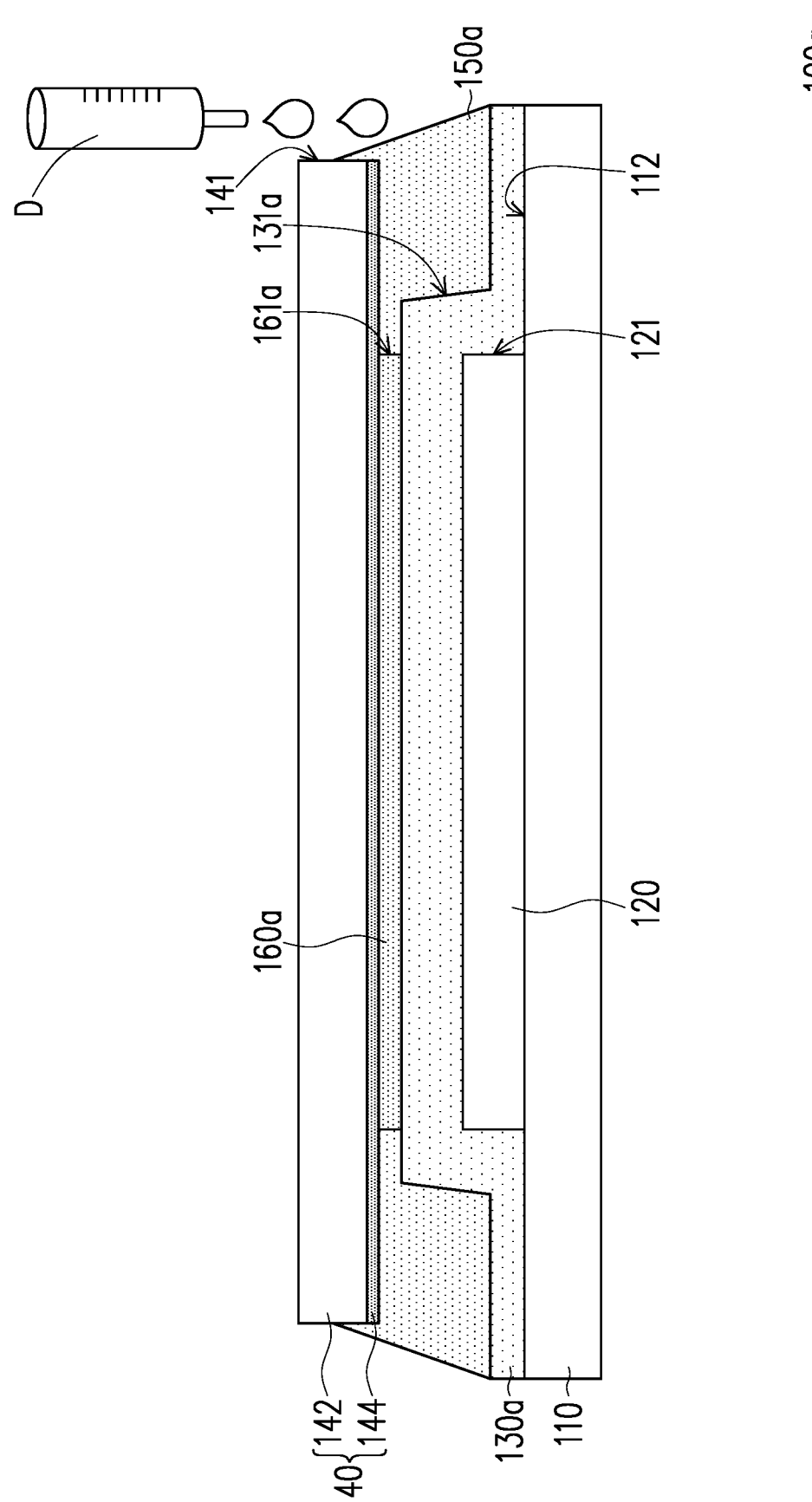

Finally, referring to FIG. 4F, the glue layer 150a is formed on the periphery 131a of the water vapor barrier layer 130a, the periphery 161a of the optical glue layer 160a, and at least part of the periphery 141 of the protective layer 140. The WVTR of the water vapor barrier layer 130a is less than the WVTR of the glue layer 150a. Here, the WVTR of the glue layer 150a is, for example, 10 g/m² day, and the glue layer 150a is, for example, epoxy, polymethylmethacrylate (PMMA) or silicone, which may enhance the waterproof performance in the environmental testing. The method for forming the glue layer 150a is, for example, dispensing through a dispensing tool D. So far, the manufacture of the display device 100a has been completed.

To sum up, in the design of the display device of the disclosure, the water vapor barrier layer covers the periphery of the display medium layer, the glue layer covers the periphery of the water vapor barrier layer, and the WVTR of the water vapor barrier layer is less than the WVTR of the glue layer. In this way, in addition to improving the water vapor barrier effect of the display medium layer in the lateral direction to prevent damage to the display medium layer caused by lateral water vapor, the width of the water barrier channel may also be effectively reduced. Therefore, the display device of the disclosure may have better structural reliability, and may achieve the effect of the narrow frame.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A display device, comprising:
   a driving substrate;
   a display medium layer, disposed on the driving substrate;
   a water vapor barrier layer, disposed on the display medium layer and covering a periphery of the display medium layer, wherein the water vapor barrier layer directly contacts the display medium layer;
   a protective layer, disposed on the water vapor barrier layer; and
   a glue layer, covering a periphery of the water vapor barrier layer and at least part of a periphery of the protective layer, wherein a water vapor transmission rate (WVTR) of the water vapor barrier layer is less than a WVTR of the glue layer.

2. The display device according to claim 1, wherein light transmittance of the water vapor barrier layer is greater than 85%.

3. The display device according to claim 1, wherein the driving substrate has a surface, the display medium layer is located on the surface to expose a part of the surface, and the water vapor barrier layer further extends to cover the surface exposed by the display medium layer.

4. The display device according to claim 3, wherein an air gap exists between the water vapor barrier layer and the periphery of the display medium layer.

5. The display device according to claim 1, wherein a material of the water vapor barrier layer comprises a polymer-derived ceramic material or an organic polymer.

6. The display device according to claim 1, wherein the protective layer comprises a cover plate and a barrier layer, the barrier layer covers a side surface of the cover plate, and a part of the barrier layer is located between the cover plate and the water vapor barrier layer.

7. The display device according to claim 1, further comprising:

an optical glue layer, disposed between the water vapor barrier layer and the protective layer or between the water vapor barrier layer and the display medium layer, and configured to fix the protective layer to the display medium layer.

8. A manufacturing method of a display device, comprising:

providing a driving substrate;

8 disposing a display medium layer on the driving substrate;

forming a water vapor barrier layer on the display medium layer and covering a periphery of the display medium layer, wherein the water vapor barrier layer directly contacts the display medium layer;

disposing a protective layer on the water vapor barrier layer; and forming a glue layer on a periphery of the water vapor barrier layer and at least part of a periphery of the protective layer, wherein a water vapor transmission rate (WVTR) of the water vapor barrier layer is less than a WVTR of the glue layer.

9. The manufacturing method of the display device according to claim 8, wherein a method for forming the water vapor barrier layer comprises spray coating or slit coating.

10. The manufacturing method of the display device according to claim 8, wherein a method for forming the glue layer comprises dispensing.

\*    \*    \*    \*    \*